(12) United States Patent
Gehrke et al.

(10) Patent No.: US 9,285,267 B2
(45) Date of Patent: Mar. 15, 2016

(54) OPTICAL COMMUNICATION RECEPTION SYSTEM

(71) Applicant: Cisco Technology, Inc., San Jose, CA (US)

(72) Inventors: Soeren Gehrke, Nuremberg (DE); Theodor Kupfer, Feucht (DE); James Whiteaway, Sawbridgeworth (GB)

(73) Assignee: Cisco Technology, Inc., San Jose, CA (US)

( * ) Notice: Subject to any disclaimer, the term of this patent is extended or adjusted under 35 U.S.C. 154(b) by 156 days.

(21) Appl. No.: 14/147,381

(22) Filed: Jan. 3, 2014

(65) Prior Publication Data

US 2014/0117200 A1 May 1, 2014

Related U.S. Application Data

(63) Continuation of application No. 13/483,950, filed on May 30, 2012, now Pat. No. 8,649,690.

(51) Int. Cl.
| | |
|---|---|
| *H04B 10/06* | (2006.01) |
| *G01J 1/04* | (2006.01) |
| *H04B 10/079* | (2013.01) |
| *H04B 10/61* | (2013.01) |
| *G01J 1/18* | (2006.01) |

(52) U.S. Cl.
CPC ............. *G01J 1/0418* (2013.01); *G01J 1/18* (2013.01); *H04B 10/0799* (2013.01); *H04B 10/07955* (2013.01); *H04B 10/61* (2013.01)

(58) Field of Classification Search
CPC .. H04B 10/61; H04B 10/616; H04B 10/6161; H04B 10/612; H04B 10/613; H04B 10/614; H04B 10/615

USPC ......... 398/202, 204, 205, 206, 207, 208, 209, 398/135, 136, 158, 159, 33, 152, 162, 38, 398/212, 213, 214

See application file for complete search history.

(56) References Cited

U.S. PATENT DOCUMENTS

| | | | | |
|---|---|---|---|---|
| 8,249,464 | B2 * | 8/2012 | Oda et al. ...................... | 398/162 |
| 8,301,039 | B2 | 10/2012 | Nishihara et al. | |
| 8,649,690 | B2 * | 2/2014 | Gehrke et al. ................ | 398/208 |
| 2010/0254718 | A1 | 10/2010 | Oda et al. | |

* cited by examiner

*Primary Examiner* — Hanh Phan

(57) ABSTRACT

A system configured to maintain a consistent local-oscillator-power-to-primary-signal-power ratio (LO/SIG ratio). The system may be configured to: receive the voltages for a plurality of optical signal components split from a combined SIG and LO signal; determine individual factors for the plurality of optical signal components; average the individual factors; determine whether the averaged output is less than an existing minimum reference value for a variable optical attenuator; determine whether the averaged output is greater than an existing maximum reference value for the variable optical attenuator; change the existing minimum reference value to a new value associated with the averaged output, due to determining that the averaged output is less than the existing minimum reference value; change the existing maximum reference value to a new value associated with the averaged output, due to determining that the averaged output is greater than the existing maximum reference value; and change a new value associated with the averaged output to be transmitted to the variable optical attenuator.

20 Claims, 7 Drawing Sheets

OPTICAL COMMUNICATION RECEPTION SYSTEM

CROSS-REFERENCE TO RELATED APPLICATIONS

This is a continuation of application Ser. No. 13/483,950 filed on May 30, 2012, the contents of all of which are hereby incorporated herein by reference in their entirety.

TECHNICAL FIELD

The present disclosure relates generally to optical communication systems.

BACKGROUND

First developed in the 1970s, fiber-optic communication systems have revolutionized the telecommunications industry. Optical fibers have largely replaced copper wire due to the advantages of fiber-optic communications over copper wire communications.

In order to implement fiber-optic communication, one node of a fiber-optic network generates an optical signal that is transmitted along optical fiber. Then another node of the fiber-optic network may receive the optical signal and convert the optical signal into an electrical signal. The generated optical signal may be derived from an electrical signal as well. Typically, along with optical fibers and control units, transceivers with the capability to convert an electrical signal to an optical signal (and vice versa) enable optical networks. Additionally, other devices besides control units, such as optical-amplification systems make fiber-optic communications viable. Such systems along with other devices ensure that a communicated optical signal does not become too distorted or weak.

DESCRIPTION OF EXAMPLE EMBODIMENTS

Overview

Figure 1:
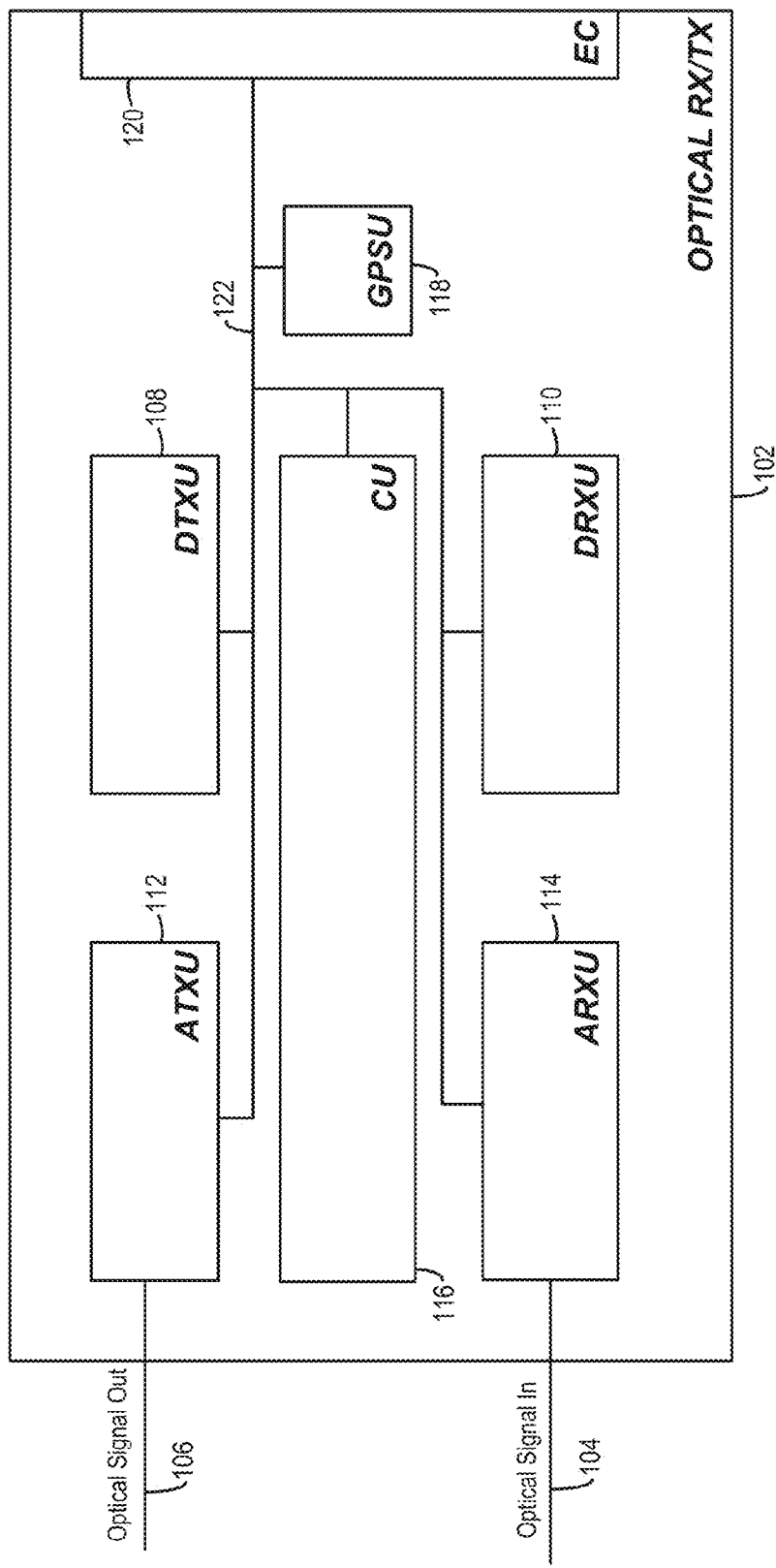
FIG. 1 illustrates a block diagram of an example transceiver that can host an optical communication reception system (OCRS).

A system including an analog receiving unit (ARXU) including a local oscillator (LO) laser, a variable optical attenuator (VOA), and an integrated dual polarization receiver module (IRX). The integrated dual polarization receiver module may be hardware, software, firmware, or any combination thereof. The LO laser and the variable optical attenuator are both coupled to the integrated dual polarization receiver module. The integrated dual polarization receiver module may include an optical hybrid, coupled to both the LO laser and the variable optical attenuator. The optical hybrid may include respective dual outputs for a plurality of optical signal components. The integrated dual polarization receiver module may also include a respective diode pair (such as a photodiode pair) and a respective transimpedance amplifier (TIA) per optical signal component, and the respective diode pair may be coupled to the respective dual outputs and to the respective transimpedance amplifier. Alternatively, a diode pair may be replaced with a single-ended diode, such as a single-ended photodiode, per tributary XI, XQ, YI, and YQ.

The respective transimpedance amplifier may include a variable gain amplifier (GA), and an output level measurement (also referred to as peak indicator or PI) output. In some aspects of the system, the respective transimpedance amplifier may also include an output adjustment (OA) input and a first controller. The respective diode pair may be coupled to the gain amplifier, and the gain amplifier may be coupled to the peak indicator. In some aspects, the peak indicator may be coupled to the first controller, and the first controller may include the output adjustment input, and a first controller output coupled to the gain amplifier.

The system further includes a control unit (CU) including a normalizing/averaging module. In some aspects, the normalizing/averaging module may be coupled to the first controller output. Also, in some aspects, the control unit may also include a second controller that may include a first second-controller input, a second second-controller input, and a second-controller output, wherein the first second-controller input is coupled to the normalizing/averaging module, the second second-controller input is a reference input, and the second-controller output is coupled to the variable optical attenuator. Also included, may be a third controller per optical signal component, which may include a respective first third-controller input, a respective second third-controller input which is a reference input, and a respective third-controller output coupled to the output adjustment input of the first controller.

The system also includes a digital receiving unit (DRXU) including an analog-to-digital converter (ADC) per optical signal component; and in some aspects, the digital receiving unit may include a histogram generator and a histogram evaluator per optical signal component. Further, the analog-to-digital converter may be coupled to the histogram generator that may be coupled to the histogram evaluator that may be coupled to the respective first third-controller input.

In some aspects, the plurality of optical signal components includes an X polarization in-phase component (XI), an X polarization quadrature component (XQ), a Y polarization in-phase component (YI), and a Y polarization quadrature component (YQ). Also, the LO laser may communicate an LO optical signal to the integrated dual polarization receiver module via an LO path, and the variable optical attenuator may attenuate a received primary optical signal (SIG) and then communicate the attenuated SIG to the integrated dual polarization receiver module via a SIG path. Further, the integrated dual polarization receiver module may include a polarization beam splitter (PBS) on the SIG path, and the integrated dual polarization receiver module may include a polarization beam splitter or a power splitter on the LO path.

Further, the optical hybrid may mix the SIG and LO optical signal, and output the XI, XQ, YI, and YQ to the respective transimpedance amplifier.

In aspects of the system with the first, second, and third controller, such controllers may facilitate maintaining a consistent LO-power-to-SIG-power ratio (also referred to as the LO/SIG ratio). In alternative aspects, only one controller of the control unit may facilitate maintaining a consistent LO-power-to-SIG-power ratio.

In some aspects of the system, a method facilitates maintaining a consistent LO-power-to-SIG-power ratio. The method includes: receiving derived voltages (e.g., voltages derived and amplified from a combined SIG and LO optical signal) for a plurality of optical signal components split from a combined SIG and LO signal; determining individual factors for the plurality of optical signal components; averaging the individual factors; determining whether the averaged output is less than an existing minimum reference value for a variable optical attenuator; determining whether the averaged output is greater than an existing maximum reference value for the variable optical attenuator; changing the existing minimum reference value to a new value associated with the averaged output, due to determining that the averaged output is less than the existing minimum reference value; changing the existing maximum reference value to a new value associated with the averaged output, due to determining that the averaged output is greater than the existing maximum reference value; and changing a new value associated with the averaged output to be transmitted to the variable optical attenuator. Also, the method may include normalizing the individual factors.

Example Embodiments

One advancement in fiber-optic communication that facilities reduction in distortion may be coherent phase-shift keying (CPSK). In general, coherent phase-shift keying is a digital modulation scheme that conveys data by modulating the phase of a reference signal. For example, coherent phase-shift keying may use a finite number of phases; each assigned a unique pattern of binary digits. A demodulator, which may be designed to recognize assigned patterns of binary digits, determines the phase of a received signal. Thus, the demodulator may recover data hosted by the signal prior to digital modulation. However, recovering such information requires that a receiver be able to compare the phase of the received signal to a reference signal.

In determining phase in a fiber-optic communication system, coherent phase-shift keying may rely on a certain optical signal-to-noise ratio (OSNR) for a given bit-error rate (BER), and that OSNR may depend on a relationship between local oscillator (LO) power and a received primary optical signal (SIG) power. Hence, controlling a ratio between LO and SIG power (the LO/SIG ratio) may be advantageous in providing fiber-optic communications for a large range of SIG power or SIG power transients, for example. Further, controlling the LO/SIG ratio may be advantageous in a selective reception configuration that includes a receiver that can receive a signal having multiple channels of varying wavelengths and an LO that selects which channel to process by matching the frequency of the LO with the frequency of a selected channel, for example. Therefore, it is of great interest to develop an optical communication reception system (OCRS) that enables controlling the LO/SIG ratio. Described herein are example optical communication reception systems that enable such functionality.

Some examples of the optical communication reception systems may include a variable optical attenuator (VOA) in a SIG path and an LO laser at an end of an LO path, which both have outputs feeding into an integrated dual polarization receiver module (IRX) designed for a coherent detection scheme. All of which may be hosted by an analog receiving unit.

The variable optical attenuator may be step-wise variable or continuously variable, for example. The variable optical attenuator may also be a built-in variable fiber-optic attenuator that is either manually adjustable or electronically controlled. An electrically controlled attenuator can provide adaptive power optimization described below.

The integrated dual polarization receiver module may include a polarization beam splitter (PBS) on the SIG path, a polarization beam splitter or a power splitter on the LO path, an optical hybrid for mixing the signals/light from the SIG and LO paths, diode pairs, such as balanced photodiode pairs, and one or more transimpedance amplifiers (TIAs). The optical hybrid may include parts for outputting components of an optical signal, such as XI, XQ, YI, and YQ components. Further, the analog receiving unit may include a diode pair and a transimpedance amplifier per component of an optical signal. There may be a diode pair that interfaces each of the optical hybrid's outputs (e.g., XI, XQ, YI, and YQ) with a respective transimpedance amplifier. Alternatively, a diode pair may be replaced with a single-ended diode, such as a single-ended photodiode, per tributary XI, XQ, YI, and YQ.

Also, regarding the optical hybrid, a laser may generate linear polarization that may exist in one axis of a polarization maintaining fiber (e.g. merely X polarization and not Y polarization). Depending on a type of the optical hybrid, the laser may be coupled at 45° into a PBS that may result in approximately a 50% split between X and Y polarizations at the output of the PBS. Alternatively, the optical hybrid may power split the X polarization into two fibers, and then rotate polarization in one fiber by 90° to generate the Y polarization. Also, the optical hybrid may also rotate the Y component of the SIG by 90° and provide hybrid mixing in one polarization.

A transimpedance amplifier may include an adjustable gain amplifier (GA), output level measurement (PI), such as a mean rectified value, and an automatic gain control (AGC). The automatic gain control may be enabled or disabled. When enabled the automatic gain control can maintain a substantially consistent output level. The automatic gain control maintains a substantially consistent output level by using at least the output level measurement, the gain amplifier, and a controller that has an automatic gain control reference level output adjustment (OA) input.

In some examples of the optical communication reception systems, the analog receiving unit may be coupled to a control unit, such as a board control unit (BCU). The control unit may include setting or adjusting the output adjustment and reading the gain amplifier of a transimpedance amplifier (alternative $\alpha$). Alternatively, the control unit may include setting the gain amplifier and reading the output level measurement of a transimpedance amplifier (alternative $\beta$). Examples of these two alternatives ($\alpha$ and $\beta$) are described below. Either way, the control unit outputs a control signal for the variable optical attenuator based on $\alpha$ or $\beta$. Also, $\alpha$ and $\beta$ may be referred to as a transimpedance amplifier automatic gain control configuration and a non-AGC configuration, respectively.

In the transimpedance amplifier automatic gain control configuration, the output adjustments may be set to a substantially consistent level, so that the LO/SIG ratio may remain substantially consistent with respect to input SIG power variation and/or variation in total power received due to adjacent channels, for example. This may require that the variable optical attenuator be controlled or configured to maintain a substantially consistent average gain of the gain amplifiers. In the non-AGC configuration, the gain amplifiers may be set to a substantially consistent level, so that the LO/SIG ratio may remain consistent where the variable optical attenuator is controlled or configured to maintain a substantially consistent average level of the output level measurements. In short, in either configuration, the variable optical attenuator may be controlled by feedback from a combination of parts from the analog receiving unit and the control unit.

In some examples of the optical communication reception systems, the analog receiving unit may be coupled to a control unit and a digital receiving unit. Both the control unit and the analog receiving unit may be coupled as well. A combination of parts from the analog receiving unit, the digital receiving unit, and the control unit may provide a feedback mechanism (or loop) for controlling the variable optical attenuator; and therefore, controlling the LO/SIG ratio as well. Examples of optical communication reception systems including these three components are described below.

With respect to the abovementioned aspects of the optical communication reception systems and the aspects of the optical communication reception systems described below and depicted in the Figures, the aspects may be implemented via software, hardware, firmware, or any combination thereof. Although specific components/modules are described, other configurations of components/modules are possible to obtain similar functionality as described herein.

FIG. 1 illustrates a block diagram of an example optical transceiver (or optical RX/TX) 102 that can host an optical communication reception system. Included are two optical paths (one for receiving 104 and one for transmitting 106 an optical signal), a digital transmitting unit (DTXU) 108, a digital receiving unit (DRXU) 110, an analog transmitting unit (ATXU) 112, an analog receiving unit (ARXU) 114, a control unit (CU) 116, a global power source unit (GPSU) 118, an electrical connector (EC) 120, such as PCB board-to-board (or stacking) connectors suitable for high-frequency signals . . . , and a bus 122 that couples each of the aforementioned components of the optical RX/TX 102.

The digital transmitting unit 108 may include 100 Gigabit Attachment Unit (CAUI) data input, TXDATA, multiplexing, pre-coding, and transmit clock synthesis.

The digital receiving unit 110 may include side signal digitalization using an analog-to-digital converter (ADC) and a digital signal processor (DSP). The analog-to-digital converter and DSP may include one or more of the following features: chromatic dispersion compensation (using FFT, frequency domain compensation, or IFFT); asynchronous sampling with a fixed sampling rate analog-to-digital converter and integrated re-sampler; fast-tracking polarization demultiplexing and all-order PMD compensation; high jitter-tolerance symbol timing recovery; carrier frequency and phase recovery; symbol decision; decoding based on frame detection or detection of specific Pseudorandom binary sequence (PRBS); and demultiplexing and CAUI data output. Also, the features may include synchronous sampling with a sampling rate being adjusted depending on a clock that is recovered from a received signal.

Regarding the asynchronous sampling, two orthogonal polarizations X and Y transmitted to the digital receiving unit 110 may be rotated with respect to orthogonal polarization axes of the PBS inside the integrated dual polarization receiver module (IRX). The angle between the two orthogonal axes depends on a fiber between the axes (e.g., depending on how a fiber is bent or twisted). A received X polarization usually is not a purely transmitted X polarization but contains a mixture of transmitted X and Y polarizations. This is the same for a received Y polarization. Delay may also occur between polarizations that are transmitted along a fiber (e.g., polarization mode dispersion, also known as PMD). The DSP may include internal filters that are capable of changing received X content into Y polarization and vice versa so that polarizations may be recovered. The internal filters can also compensate for PMD.

In some embodiments, the tributaries XI, XQ, YI, YQ may be identified and data may be received in a frame (e.g. OTU4). The frame may include a frame header, and such a header may be used to recover information pertaining to identification of one of the tributaries. In addition to detecting a frame header, the DSP also can detect PRBS sequences, as mentioned above. The tributaries may carry a similar PRBS, but there are certain shifts in time or inversions of the PRBS between the tributaries. These shifts or inversions may be used by the analog receiving unit to identify XI, XQ, YI, and YQ, for example.

Examples of the digital receiving unit 110 will be described below.

The analog transmitting unit 112 may include RF signal conditioning, dual-polarization electro-optical CPSK modulation, TX optical continuous wave generation, and RX LO optical continuous wave generation. The analog transmitting unit 112 may also include an integrated tunable laser assembly (ITLA) and an output variable optical attenuator.

The analog receiving unit 114 may include an input variable optical attenuator and an integrated dual polarization receiver module (described below), for example. Some examples of the analog receiving unit 114 are described below.

The control unit 116 may be a central control unit or a collection of control units, responsible for external communication to a host of the optical RX/TX 102 and/or an external terminal used for testing, debugging, configuring, performance monitoring, alarm generation, and exception handling, for example. The control unit 116 may also provide processing for the described feedback mechanisms described herein. Some examples of the control unit 116 will be described below.

Operation of the global power source unit 118 includes filtering and distribution of power supply voltage to the components of the optical RX/TX 102. The global power source unit 118 may also include supply voltage supervision. Each of the other components of the RX/TX 102 may also include local supply voltage filtering, distribution, and supervision.

The bus 122 may include external and internal interfaces. For example, the bus 122 may include an optical transmit (TX) interface that may be the transmit direction optical fiber output connection from the analog transmitting unit. The bus 122 also may include an optical receive (RX) interface that may be the receive direction optical fiber input connection to the analog receiving unit. It may also include an electrical data interface TX (a TXDATA interface) that is the transmit direction digital transmission interface of the digital transmitting unit. It may also include an electrical data interface RX (a RXDATA interface) that is the receive direction digital transmission interface of the digital receiving unit. Also included may be a management interface that administers control type signals, including control signals communicated between the optical RX/TX 102 and/or the host of the optical RX/TX. The management interface may include interfaces to the control unit 116. External interfaces for the optical RX/TX 102 may include a power interface that interfaces the global power source unit 118 and a debug interface that interfaces the control unit 116. The internal interfaces may include internal transmission interfaces, such analog high-speed interfaces for TX and RX, internal control interfaces, such as control interfaces between the control unit 116 and the other components of the optical RX/TX 102, and internal power interfaces, such as interfaces between the global power source unit 118 and local power supplies.

Figure 2:
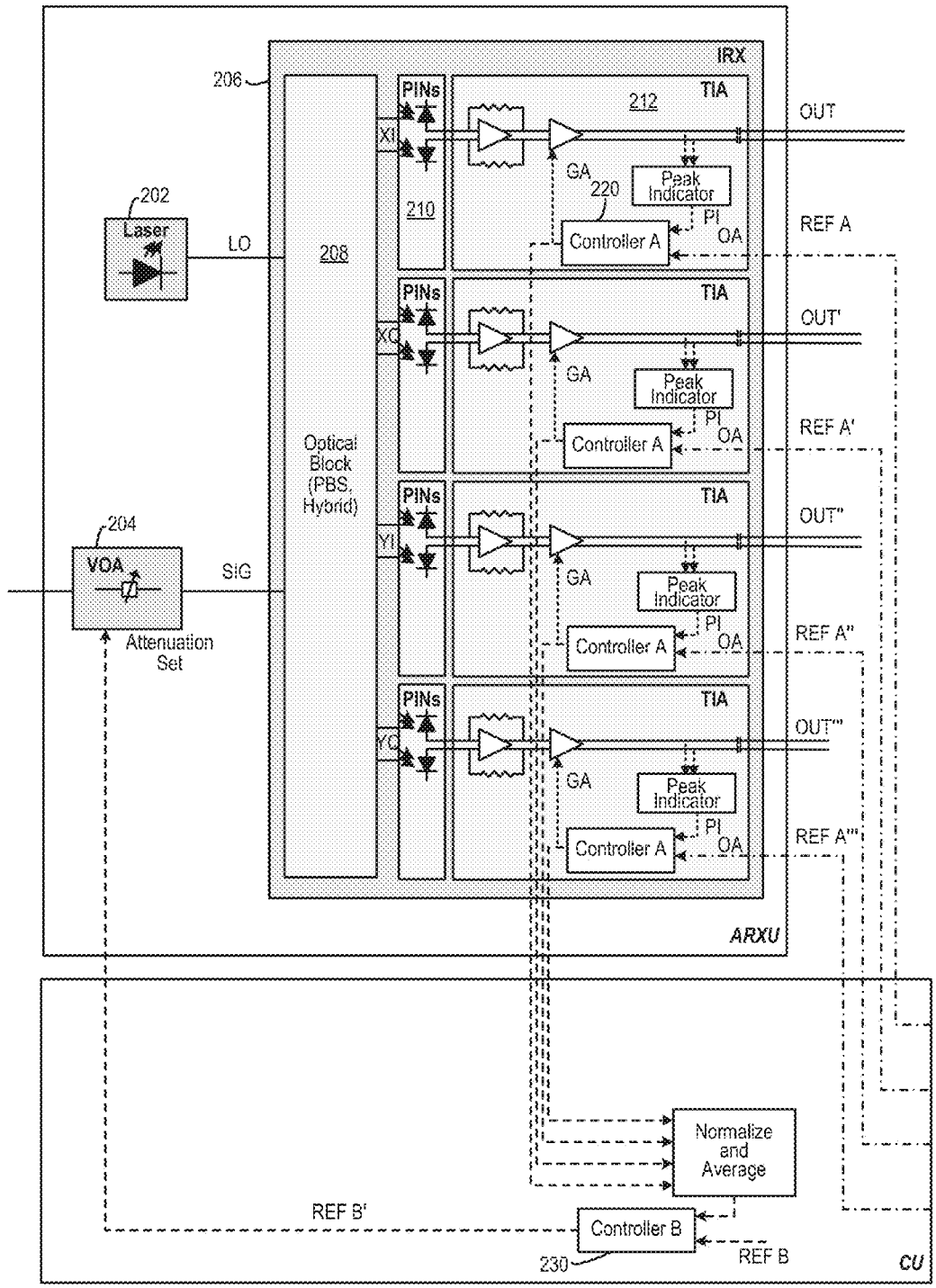
FIG. 2 illustrates a block diagram of an example analog receiving unit (ARXU) and an example control unit (CU) of a first example of an optical communication reception system.
Figure 3:
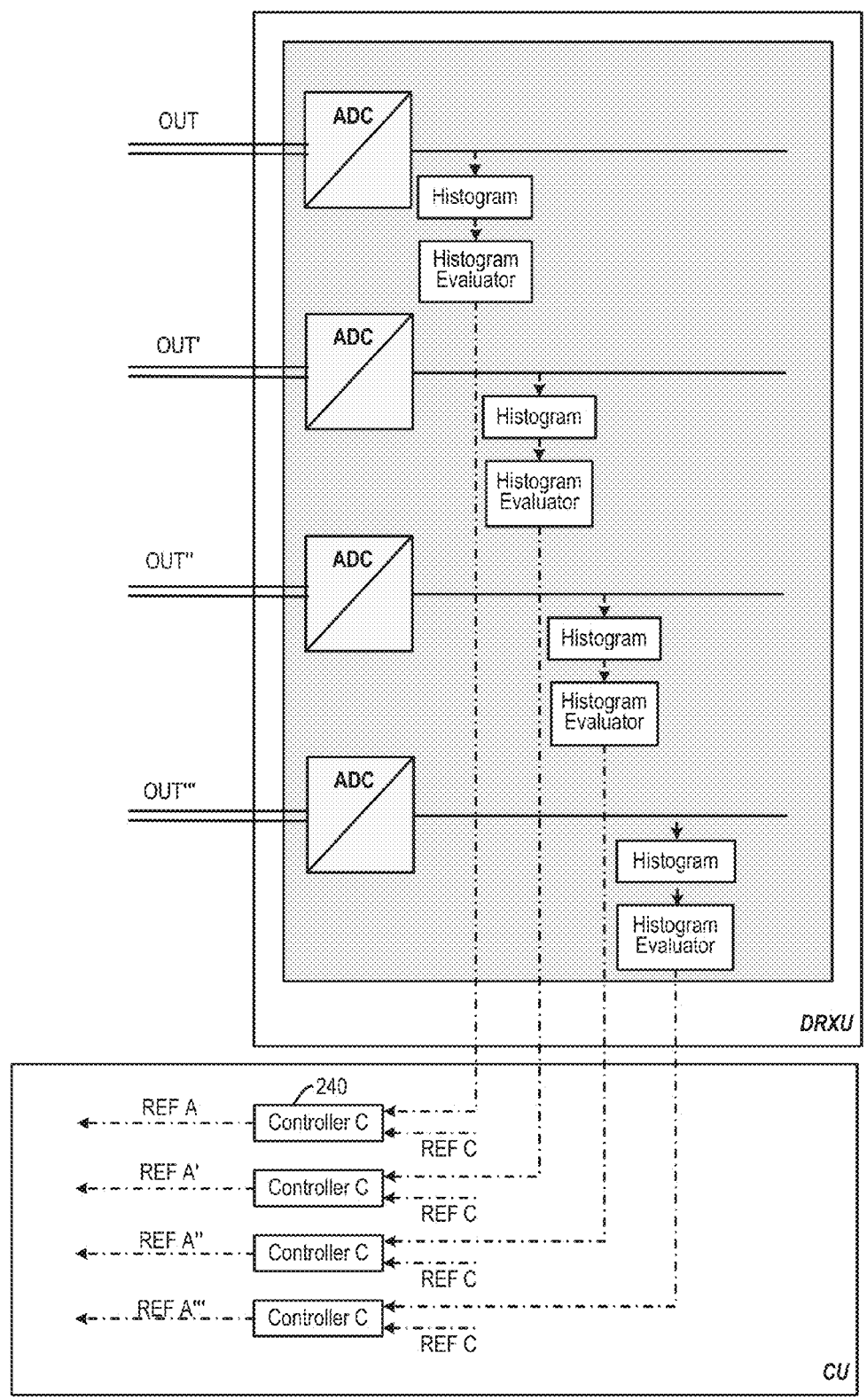
FIG. 3 illustrates a block diagram of an example digital receiving unit (DRXU) and the control unit of the first optical communication reception system of FIG. 2.

FIGS. 2 and 3 illustrate a block diagram of an example analog receiving unit, digital receiving unit, and control unit of a first example of an optical communication reception system. The first example of an optical communication reception system may be associated with the transimpedance amplifier automatic gain control configuration, for example. The first example of an optical communication reception system may benefit from a consistent LO power and slow (e.g., rates from approximately 50 to 200 Hz) variable optical attenuator adjustment to maintain LO/SIG ratio consistent.

The analog receiving unit of FIG. 2 includes an LO laser 202, a variable optical attenuator 204, and an integrated dual polarization receiver module 206. The analog receiving unit also includes an optical hybrid 208 including dual outputs for each optical signal component XI, XQ, YI, and YQ, for example. The analog receiving unit also includes a respective diode pair (e.g., a diode pair 210), such as a respective photodiode pair, and a respective transimpedance amplifier (e.g., a transimpedance amplifier 212) for each optical signal component. The transimpedance amplifier for each optical signal component may include a transimpedance stage, a variable/adjustable gain amplifier, a peak indicator (or other type of output level measurement), an output adjustment, and a Controller A (e.g., a Controller A 220).

The control unit of FIGS. 2 and 3 includes a normalizing/averaging module, a Controller B 230, a REF B signal path (an input signal path for the Controller B 230), a REF B' signal path (an output signal path of the Controller B), a Controller C for each optical signal component (e.g., a Controller C 240), a REF A signal path for each optical signal component (an output signal path of the Controller C), and a REF C signal path for each optical signal component (an input signal path for the Controller C).

The digital receiving unit of FIG. 3 includes an analog-to-digital converter, a histogram generator, and a histogram evaluator for each optical signal component.

The optical hybrid 208 may include one or more polarization beam splitters so that a combined signal including the SIG and LO may be split into at least four components, for example. However, many other configurations of dividing the SIG and LO are imaginable. Once the SIG and LO are split, the respective diode pairs (e.g., the diode pair 210) interface the optical hybrid with respective transimpedance amplifiers (e.g., the transimpedance amplifier 212). As mentioned above, a transimpedance amplifier may include a transimpedance stage, a variable/adjustable gain amplifier, a peak indicator (or other type of output level measurement), and an output adjustment, for example.

Although an LO laser 202 is depicted, any type of local oscillator may provide the LO to the integrated dual polarization receiver module in alternative examples of the analog receiving unit. Further, the variable optical attenuator 204 may be any type of variable optical attenuator, such as stepwise variable or continuously variable optical attenuator. Also, although the integrated dual polarization receiver module is depicted to include the optical hybrid 208, the diode pairs, and the transimpedance amplifiers, one or more of such parts may be external to the integrated dual polarization receiver module. In some configurations, the variable optical attenuator 204 and/or the laser 202 may be part of the integrated dual polarization receiver module; and in some other configurations, depicted aspects of the integrated dual polarization receiver module may be separate from the integrated dual polarization receiver module but part of the analog receiving unit. The above alternatives are merely illustrative and should not be understood as limiting.

The functionality of the Controllers A, B, and C of the first example of an optical communication reception system are described below.

As illustrated in FIG. 2, a Controller A (or automatic gain control) may receive output adjustment input (e.g., REF A) from a Controller C (described further below) and a peak indicator. These two inputs facilitate substantially consistent swing of an optical signal component (e.g., optical signal component XI) before the optical signal component is normalized and/or averaged with the other components (e.g., XQ, YI, and YQ) by the normalizing/averaging module of the control unit. After normalization and/or averaging of the optical signal components, a normalized and/or averaged signal may be inputted into the Controller B 230 (described further below) along with a certain consistent target transimpedance amplifier gain. Further, the output of a Controller A may also provide feedback to a respective gain amplifier.

A Controller A may adjust a respective transimpedance amplifier's gain (e.g., transimpedance amplifier 212) so that an output swing of that transimpedance amplifier is substantially consistent. The adjusted transimpedance amplifier gain may be a measure for coherently detected AC swing. This detected AC swing may include swing from an optical signal component's swing. The detected AC swing may also include additional signal components, such as optical noise, electrical noise, and directly detected signals. A peak indicator of the transimpedance amplifier may react to the additional signal components as well as to chromatic dispersion or non-linear optical effects. For example, by mixing a received signal with an LO of a certain wavelength all signal components in proximity of that wavelength are transferred into a baseband. A baseband frequency content that falls within bandwidth of a receiver (e.g., 25 GHz for a 100 G system with four tributaries) can be further processed or coherently received. An electrical signal generated from such mixing then may be proportional to an electric field component of incident light. Alternatively, a photodiode, which a non-linear device for example, has photocurrent that may be proportional to optical power that may be the electric field component squared. This non-linear relationship may also result in directly detecting frequency components in the baseband (e.g., detection of the frequency components without LO mixing).

Further, non-linear optical effects may include self-phase modulation (SPM) and cross-phase modulation (XPM). A refractive index (which is equivalent to propagation speed) of a fiber may change depending on optical power that is present. For example, a pulse of optical power may travel along a fiber, and under that pulse, the refractive index may change. Such circumstances may result in two different propagation speeds depending on the optical power. This may result in phase distortion of the light.

As shown in FIGS. 2 and 3, a respective gain amplifier may output a respective optical signal component (e.g., XI) of the LO and SIG signal and this output may be converted from an analog signal to a digital signal by a respective analog-to-digital converter of the digital receiving unit. The digital signal then may be the input for a histogram generator. Because of processing the digital signal, a histogram may be generated by the generator and used by a histogram evaluator to approximate swing of an optical signal component outputted by the transimpedance amplifier. This approximated swing may then be fed back to a respective Controller A as the output adjustment input after being processed by a respective Controller C (e.g., the Controller C 240). Further, a Controller C may adjust a reference level (e.g., the REF A) for the respective Controller A, so that the respective transimpedance amplifier may output a substantially consistent optical signal component swing. As mentioned above, a Controller C (e.g., the Controller C 240) receives input regarding histogram evaluation and a reference signal (e.g., REF C).

A Controller B, such as Controller B 230, adjusts the variable optical attenuator 204 so that the variable optical attenuator produces a substantially consistent SIG swing. A Controller B may base the adjustments using the certain substantially consistent target transimpedance amplifier gain (e.g., the REF B) that may also facilitate a substantially consistent LO and SIG swing (e.g., swing of REF B') at the input of a transimpedance amplifier. As mentioned above, where the LO remains consistent the LO/SIG ratio may remain consistent as well.

Figure 4:
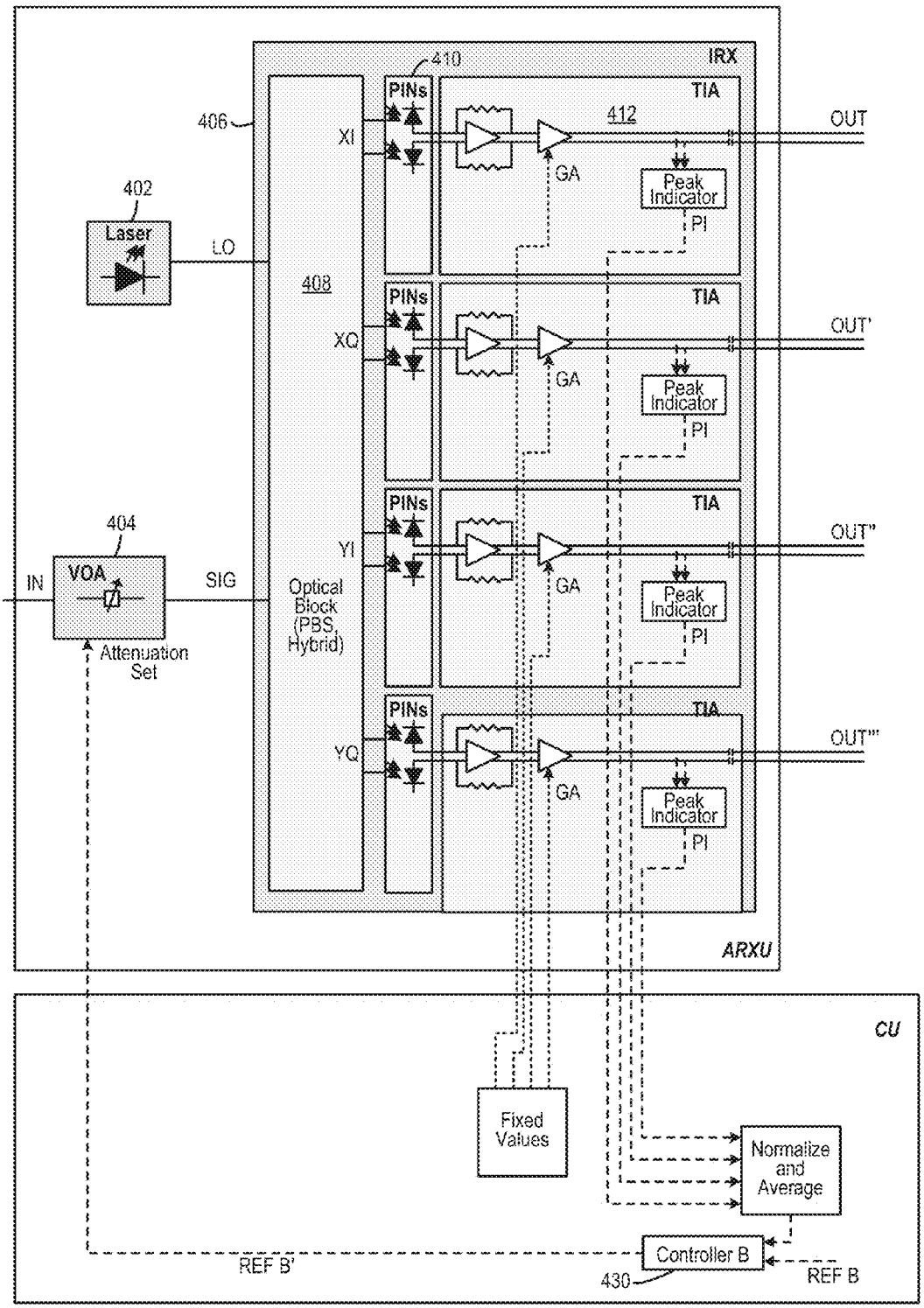
FIG. 4 illustrates a block diagram of an example analog receiving unit and an example control unit of a second example of an optical communication reception system.
Figure 5:
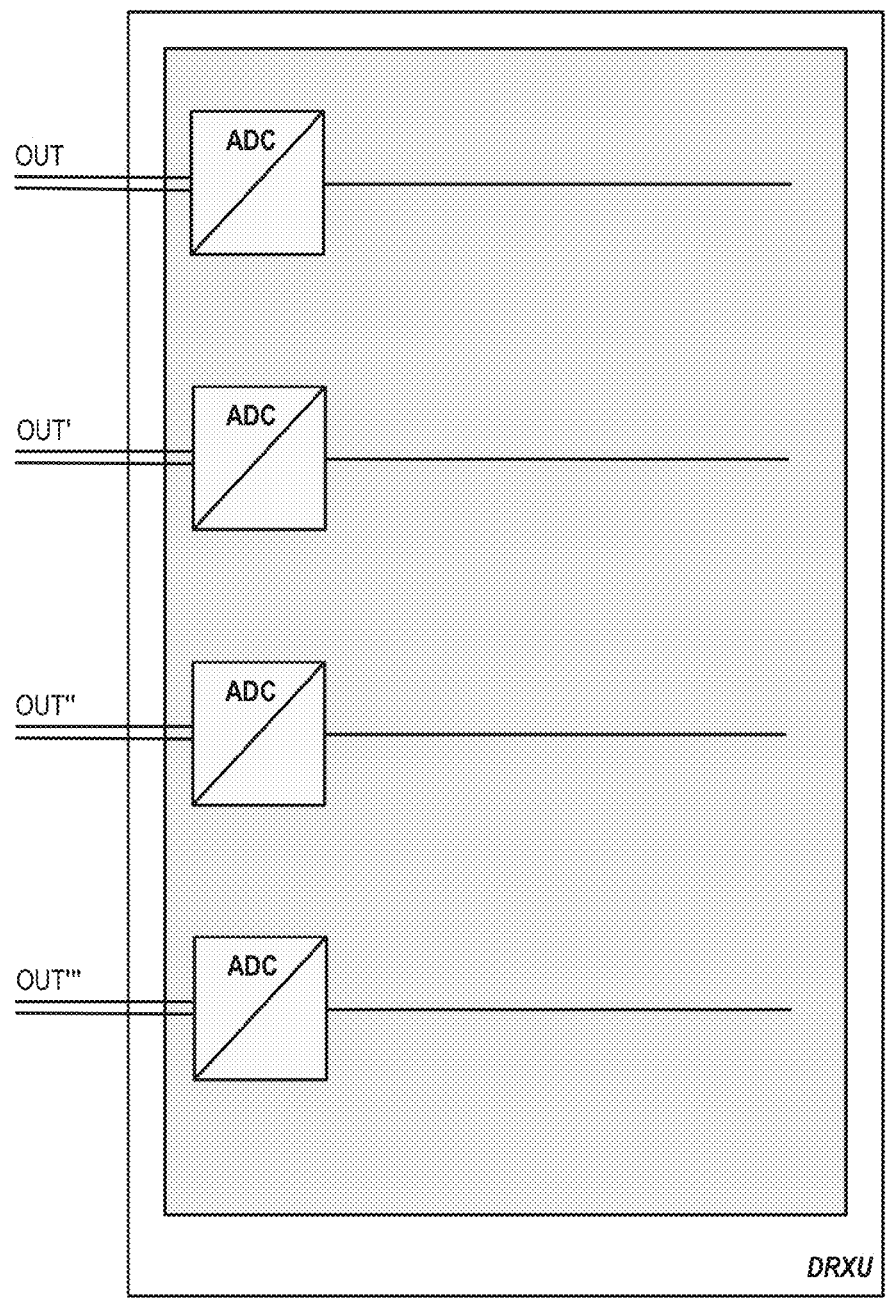
FIG. 5 illustrates a block diagram of an example digital receiving unit of the second optical communication reception system of FIG. 4.

FIGS. 4 and 5 illustrate a block diagram of an example analog receiving unit, digital receiving unit, and control unit of a second example of an optical communication reception system. The second example of an optical communication reception system may be associated with the non-AGC configuration, for example. The second example of an optical communication reception system may benefit from a substantially consistent LO power and fast variable optical attenuator adjustment (e.g., approximately 500 kHz) to maintain a consistent LO/SIG ratio.

The analog receiving unit of FIG. 4 includes an LO laser 402, a variable optical attenuator 404, and an integrated dual polarization receiver module 406. The analog receiving unit also includes an optical hybrid 408 including dual outputs for each optical signal component XI, XQ, YI, and YQ. The analog receiving unit also includes respective diode pairs (e.g., a pair 410), such as respective photodiode pairs, and a respective transimpedance amplifier (e.g., transimpedance amplifier 412) for each optical signal component. The transimpedance amplifier for each optical signal component may include a transimpedance stage, a variable/adjustable gain amplifier, and a peak indicator (or other type of output level measurement).

The control unit of FIG. 4 includes a normalizing/averaging module, a Controller B 430, a REF B signal path (an input signal path for the Controller B), and a REF B' signal path (an output signal path of the Controller B).

The digital receiving unit of FIG. 5 includes an analog-to-digital converter for each optical signal component.

The optical hybrid 408 may include one or more polarization beam splitters so that a combined signal including the SIG and LO may be split into at least four components, for example. However, many other configurations of dividing the SIG and LO are imaginable. Once the SIG and LO are split, the respective diode pairs (e.g., the diode pair 410) interface the optical hybrid with respective transimpedance amplifiers (e.g., the transimpedance amplifier 412). As mentioned above, a transimpedance amplifier may include a transimpedance stage, a variable/adjustable gain amplifier, a peak indicator (or other type of output level measurement), and an output adjustment, for example.

Although an LO laser 402 is depicted, any type of local oscillator may provide the LO to the integrated dual polarization receiver module in alternative examples of the analog receiving unit. Further, the variable optical attenuator 404 may be any type of variable optical attenuator, such as stepwise variable or continuously variable optical attenuator. Also, although the integrated dual polarization receiver module is depicted to include the optical hybrid 408, the diode pairs, and the transimpedance amplifiers, one or more of such parts may be external to the integrated dual polarization receiver module. In some configurations, the variable optical attenuator 404 and/or the laser 402 may be part of the integrated dual polarization receiver module; and in some other configurations, depicted aspects of the integrated dual polarization receiver module may be separate from the integrated dual polarization receiver module but part of the analog receiving unit. The above alternatives are merely illustrative and should not be understood as limiting.

The functionality for the Controller B 430 and a transimpedance amplifier of the second example of an optical communication reception system are described below.

As illustrated in FIG. 4, a Controller A (or automatic gain control) is not utilized by a transimpedance amplifier. Instead, a transimpedance amplifier's gain may be fixed. Also, as illustrated, the Controller B 430 is coupled to the variable optical attenuator 404 and the integrated dual polarization receiver module 406 to maintain a certain average swing for the optical signal components outputted from the transimpedance amplifiers. The Controller B 430 maintains this substantially consistent swing by reading the outputs of the peak indicators after they are normalized and/or averaged by the normalizing/averaging module of the control unit. Also, after normalization and/or averaging of the optical signal components, a normalized and/or averaged signal may be inputted into the Controller B 430 along with a certain substantially consistent target transimpedance amplifier gain (e.g. the REF B). Although not depicted, alternatively, the normalized and/or averaged signal may be inputted into the Controller B 430 along with a dynamic REF B for each optical signal component.

A dynamic REF B may include similar information to a REF A of FIGS. 2 and 3. Further, although not depicted, the parts of the digital receiving unit and the control unit of FIG. 3 may be combined with the parts of FIG. 4. In such a case REF A, REF A', REF A", and REF A'" may be normalized and/or averaged into a REF B which may serve as input for a Controller B. Also, in this case (which is not depicted), histograms of sampled waveforms (e.g., sampled by the analog-to-digital converters for each optical signal component) may be utilized to estimate swings of the optical signal components. For example, a respective gain amplifier of FIG. 4 may output a respective optical signal component (e.g., XI) of the LO and SIG signal and this output may be converted from an analog signal to a digital signal by a respective analog-to-digital converter of the digital receiving unit of FIG. 5. A respective digital signal then may be the input for a histogram generator (not depicted in FIG. 5); and due to the digital signal, a histogram may be generated by the generator and used by a histogram evaluator (not depicted in FIG. 5) to approximate swing of an optical signal component outputted by the respective transimpedance amplifier. This approximated swing may be averaged and/or normalized with swings for the other optical signal components after being processed by a respective Controller C (e.g., a Controller C similar to the Controller C 240 depicted in FIG. 3). Then this averaged and/or normalized signal may be fed to the Controller B 430 as mentioned above. A Controller C for this case may also receive a reference signal (e.g., a REF C similar to a REF C of FIG. 3). Further in this case or the case of FIGS. 2 and 3, a controller C may adjust the reference level for a Controller B 430 or a Controller A, respectively, to compensate for optical and electrical signal distortions.

Referring back to the Controller B 430, it may adjust the variable optical attenuator 404 so that the variable optical attenuator produces a substantially consistent LO and SIG swing. The Controller B 430 may base the adjustments using the certain substantially consistent target transimpedance amplifier gain (e.g., REF B) that may also facilitate a substantially consistent LO and SIG swing (e.g., swing of REF B') at the input of a transimpedance amplifier. As mentioned above, where the LO remains consistent the LO/SIG ratio may remain consistent as well. Further, the Controller B 430 may operate based on the average of the peak indicators, and may compensate for polarization dependent loss (PDL) and differences in insertion loss or responsivity of the analog-to-digital converters of FIG. 5.

Referring back to the first example of an optical communication reception system depicted in FIGS. 2 and 3, the Controllers A, B, and C along with other parts of the optical communication reception system may make up continuous closed-loop controls. Furthermore, the Controller B of FIG. 4 along with other parts may make up a continuous closed loop control.

Also, the LO lasers 202 and 402 may include a closed-loop control, such as an integrated closed-loop control. Further, regarding the LO power for the LO laser 202, it may be set during factory calibration, for example.

The continuous closed-loop controlled by a Controller A may be a mean rectified value control loop (AGC). The automatic gain control may control a differential output AC voltage swing of each of the transimpedance amplifiers, for example. Also, an error signal may be derived from the mean rectified value of the output swing, for example. The automatic gain control is depicted by a dotted line in FIG. 2. Further the automatic gain control may be controlled by another control loop (e.g., automatic gain control reference level control loop (OA control) depicted by a dashed/dotted line in FIGS. 2 and 3).

Figure 6:
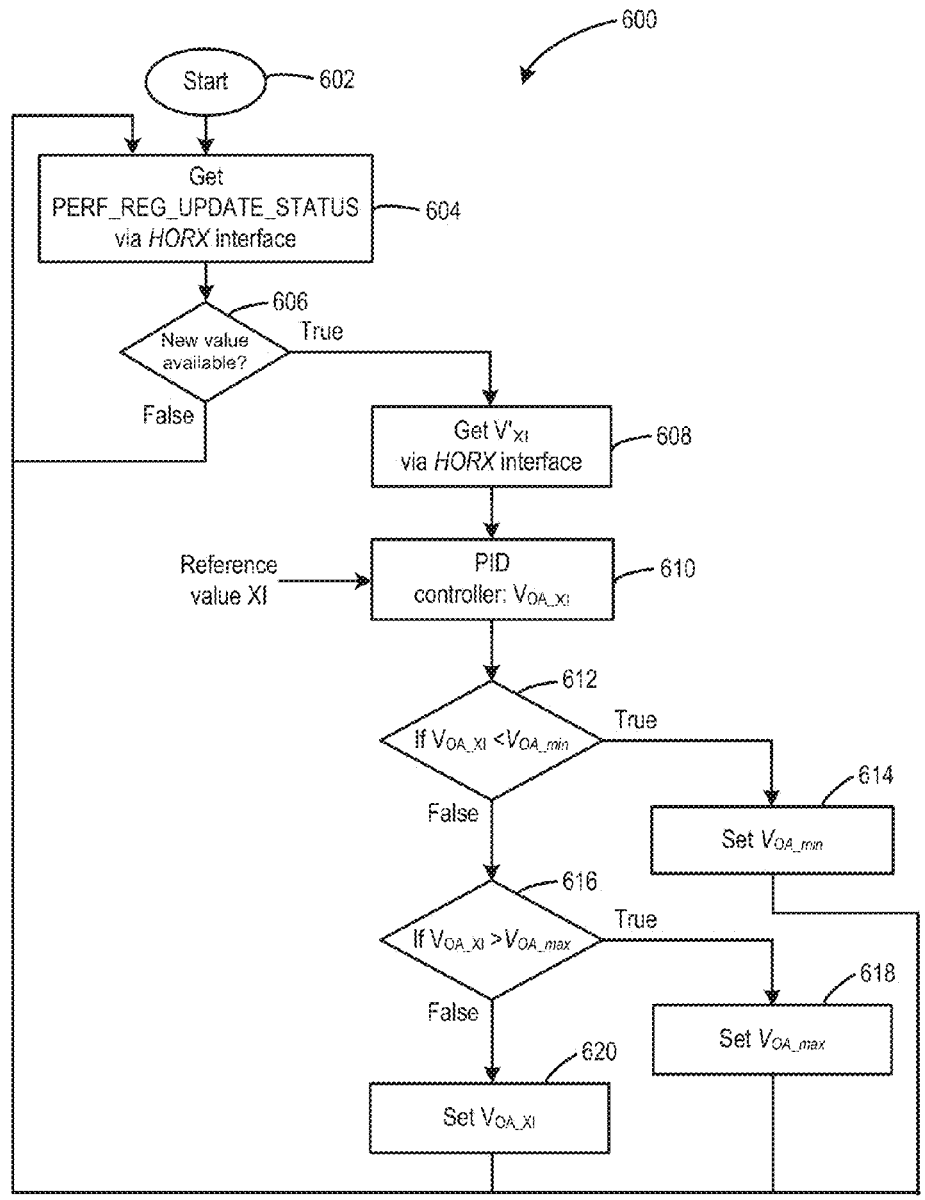
FIG. 6 illustrates a flow chart of an example output adjustment (OA) control method for controlling an example optical communication signal component.

FIG. 6 illustrates a flow chart of an example output adjustment control method 600 for an example optical communication signal component, such as an X polarization in-phase component (XI), an X polarization quadrature component (XQ), a Y polarization in-phase component (YI), and a Y polarization quadrature component (YQ). In general, this loop may be configured to derive information about optimum projection of optical signal components onto their respective analog-to-digital converters. The analog-to-digital converters may be used with a digital signal processor (DSP) for example to adjust the output adjustment (or automatic gain control reference level), and adapt the height of voltage swings of the optical signal components. Within this loop, an error signal may be based on a vertical histogram of data sampled by an analog-to-digital converter.

A Controller C may control the output adjustment control method 600, which may include a proportional-integral-derivative (PID) controller and may update respective parts of a transimpedance amplifier at a rate of 2 Hz, for example. Also, in general, any aspect of the output adjustment control method 600 may be implemented via software, hardware, firmware, or any combination thereof.

The output adjustment control method 600 begins (602) with the control unit 116 polling for a new value from the digital receiving unit 110 via an electrical receive (RX) interface (604). The new value may be a new voltage for XI, for example. Next, the control unit 116 for example may determine whether a new value is available for the output adjustment (606). Where it is determined that a new value is available, the control unit 116 for example may request the new value via the optical RX interface (608). Otherwise, the polling continues at 604. The Controller C may receive the new value along with at least one reference value, such as a reference value for a voltage for XI, for example (610). The Controller C then may determine whether the new value is less than an existing minimum reference value (612) or greater than an existing maximum reference value (616). Where the Controller C determines for example that the new value is less than the existing minimum reference value, the Controller C for example may change the existing minimum reference value to the new value (614). Where the Controller C determines for example that the new value is greater than the existing maximum reference value, the Controller C for example may change the existing maximum reference value to the new value (618). Otherwise, the Controller C for example sets the value to be transmitted to the output adjustment as the new value (620). In the meantime or during 606-620, the polling may continue at 604.

Figure 7:
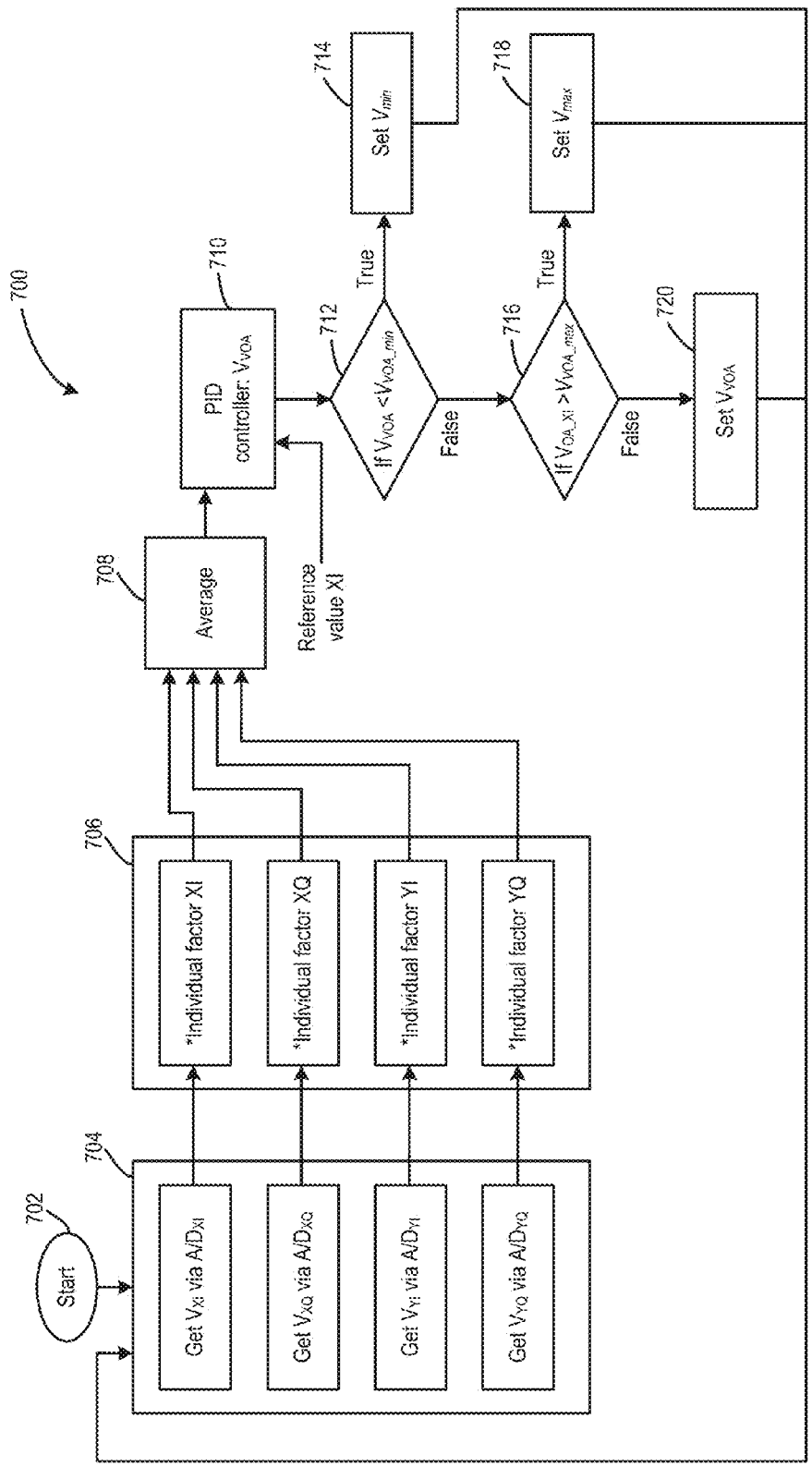
FIG. 7 illustrates a flow chart of an example received-signal-power control method for controlling power of example optical communication signal components.

FIG. 7 illustrates a flow chart of an example received-signal-power control method 700 (Rx variable optical attenuator control 700) for example optical communication signal components, such as XI, XQ, YI, and YQ. In general, this control loop may be configured to maintain a consistent average gain amplifier reading. The Rx variable optical attenuator controller's reference level, e.g. REF B, may be consistent and subject to factory calibration. Where this control loop's performance is inadequate, an algorithm may be developed (via software, hardware, firmware, or a combination thereof) that sets the reference level based upon a performance indicator. A performance indicator may include an amount of corrections a forward-error correction (FEC) block has made, for example. The FEC may reside external to the optical transceiver 102, for example. A Controller B may control the Rx variable optical attenuator control 700, which may be a PID controller and may update respective parts of a transimpedance amplifier at a rate of 50 Hz, for example. Further, static gain and responsivity differences between the optical communication signal components may be imbedded in hardware or programmable via software or firmware. This may be done during factory calibration.

The Rx variable optical attenuator control 700 illustrated in FIG. 7 is from the point of view of the control unit 116, for example. Also, in general, any aspect of the Rx variable optical attenuator control 700 may be implemented via software, hardware, firmware, or any combination thereof.

The Rx variable optical attenuator control 700 begins (702) with the control unit 116 receiving the voltages for each of XI, XQ, YI, and YQ from the analog receiving unit 114 via an analog-to-digital converter/interface (704). The control unit 116 also determines individual factors for each of XI, XQ, YI, and YQ (706). These individual factors may be averaged and/or normalized, for example (708). The averaged and/or normalized signal, e.g., averaged voltage signal, then may be received by the Controller B, which may include a PID controller (710). The Controller B may also receive the averaged and/or normalized signal along with at least one reference value, such as REF B (710). The Controller B then may determine whether the averaged and/or normalized signal is less than an existing minimum reference value for a variable optical attenuator (712) or greater than an existing maximum reference value for a variable optical attenuator (716). Where the Controller B determines for example that the averaged and/or normalized signal is less than the existing minimum reference value, the Controller B for example may change the existing minimum reference value to a new value associated with the signal (714). Where the Controller B determines for example that the averaged and/or normalized signal is greater than the existing maximum reference value, the Controller B for example may change the existing maximum reference value to a new value associated with the signal (718). Also, the Controller B for example sets the new value associated with the averaged and/or normalized signal to be transmitted to the variable optical attenuator as the new value, such as the new V$_{VOA}$ (720). In the meantime or during 704-720, polling of each gain amplifier's output may continuously occur.

The term "module" may be defined to include a plurality of executable modules. As described herein, the modules are defined to include software, hardware or some combination thereof executable by a processor. Software modules may include instructions stored in memory that are executable by the processor. Hardware modules may include various devices, components, circuits, gates, circuit boards, and the like that are executable, directed, and/or controlled for performance by the processor. Furthermore, any aspect of the system or combination of aspects described herein may be a module.

With respective to the above descriptions, various embodiments described herein can be used alone or in combination with one another. The foregoing detailed description has described only a few of the many possible implementations of the present embodiments. For this reason, this detailed description is intended by way of illustration, and not by way of limitation.

We claim:

1. A method, comprising:
    receiving an optical signal, via an attenuator;
    receiving a local oscillator signal from a local oscillator source;
    identifying voltages for optical signal components of the optical signal and of the local oscillator signal, wherein the voltages for the optical signal components are analog signal components;
    identifying voltages for additional signal components associated with optical noise and electrical noise;
    determining a ratio representing a relationship between signal power of the optical signal and signal power of the local oscillator signal based on the voltages for the analog signal components and the additional signal components; and
    transmitting a control signal to the attenuator, the control signal configured to control the optical signal to maintain the ratio.

2. The method of claim 1, wherein the attenuator is a variable attenuator.

3. The method of claim 1, wherein the receiving of the optical signal and the local oscillator signal occurs at a dual polarization receiver.

4. The method of claim 3, wherein the identifying of the voltages for the optical signal components occurs at a control unit communicatively coupled to the dual polarization receiver.

5. The method of claim 4, wherein the determining of the ratio occurs at the control unit.

6. The method of claim 1, further comprising:
    averaging the voltages for the optical signal components over a period of time; and
    generating the control signal according to the averaged voltages for the optical signal components.

7. The method of claim 1, wherein the method further comprises:
    converting the analog signal components to digital signal components;
    analyzing the digital signal components; and
    generating the control signal according to the analyzed digital signal components.

8. An apparatus, comprising:
    a local oscillator source configured to output a local oscillator signal;
    an attenuator configured to: receive an optical signal; attenuate the optical signal;
    and output the attenuated optical signal;
    a dual polarization receiver communicatively coupled to the local oscillator source and the attenuator, the dual polarization receiver configured to receive the attenuated optical signal from the attenuator and the local oscillator signal from the local oscillator source; and
    a control unit communicatively coupled to the dual polarization receiver and configured to:
    identify voltages for optical signal components of the attenuated optical signal and of the local oscillator signal, wherein the voltages for the optical signal components are analog signal components;
    identify voltages for additional signal components associated with optical noise and electrical noise;
    determine a ratio representing a relationship between signal power of the attenuated optical signal and signal power of the local oscillator signal based on the voltages for the analog signal components and the additional signal components; and
    transmit a control signal to the attenuator, the control signal configured to maintain the ratio.

9. The apparatus of claim 8, wherein the dual polarization receiver includes an optical hybrid, and wherein the optical hybrid includes:
    a respective dual output per optical signal component of the optical signal components; and
    a respective transimpedance amplifier communicatively coupled to the respective dual output, per optical signal component of the optical signal components.

10. The apparatus of claim 9, wherein the respective transimpedance amplifier includes a gain amplifier and an amplifier controller, and wherein the amplifier controller includes an output adjustment input, a peak indicator, and a controller output that is coupled to the gain amplifier.

11. The apparatus of claim 8, wherein the control unit includes an averaging device communicatively coupled to the attenuator, the averaging device configured to: average the voltages for the optical signal components over a span of time; and output the averaged voltages to the attenuator, via the control signal.

12. The apparatus of claim 8, wherein the control unit is communicatively coupled to a digital analysis unit, wherein the digital analysis unit is configured to analyze the optical signal components, and wherein the control unit is configured to generate the control signal according to the analysis of the optical signal components.

13. The apparatus of claim 8, wherein the dual polarization receiver is configured to:
    mix the local oscillator signal and the attenuated optical signal; and
    derive an X polarization in-phase component, an X polarization quadrature component, a Y polarization in-phase component, and a Y polarization quadrature component from the mixed signal.

14. The apparatus of claim 8, wherein the dual polarization receiver includes a polarization beam splitter within a communication path of the dual polarization receiver and the attenuator.

15. The apparatus of claim 8, wherein the dual polarization receiver includes a polarization beam splitter within a communication path of the dual polarization receiver and the local oscillator source.

16. A network device, comprising:
electrical hardware components; and
an optical receiver communicatively coupled to at least one of the electrical hardware components, the optical receiver including:
a local oscillator source configured to output a local oscillator signal;
an attenuator configured to: receive an optical signal; attenuate the optical signal;
and output the attenuated optical signal;
a mixer communicatively coupled to the local oscillator source and the attenuator, the mixer configured to:
receive the attenuated optical signal and the local oscillator signal; and
mix the attenuated optical signal and the local oscillator signal, resulting in a mixed optical signal; and
a controller communicatively coupled to the mixer and configured to:
identify voltages for optical signal components of the mixed optical signal, wherein the voltages for the optical signal components are analog signal components;
identify voltages for additional signal components associated with optical noise and electrical noise;
determine a value representative of the mixed optical signal according to the voltages for the analog signal components and the additional signal components; and
transmit a control signal to the attenuator, the control signal including the value.

17. The network device of claim 16, wherein the attenuator is configured to attenuate the optical signal according to the control signal.

18. The network device of claim 16, wherein the attenuation by the attenuator of the optical signal maintains a value of the optical signal within a range.

19. The network device of claim 18, wherein the value is associated with a ratio that identifies a relationship between power levels of the attenuated optical signal and the local oscillator signal.

20. The network device of claim 16, wherein the mixer includes a dual polarization receiver.

* * * * *